United States Patent [19]

St. Martin, Jr.

[11] 4,434,965

[45] Mar. 6, 1984

[54] LOW FLOW CONTROL VALVE

[75] Inventor: Leo I. St. Martin, Jr., N. Hampton, N.H.

[73] Assignee: H. D. Baumann Assoc., Ltd., Portsmouth, N.H.

[21] Appl. No.: 342,511

[22] Filed: Jan. 22, 1982

[51] Int. Cl.³ ............... F16K 47/00; F16L 55/02
[52] U.S. Cl. ........................... 251/121; 251/225
[58] Field of Search .................... 251/121, 225

[56] References Cited

U.S. PATENT DOCUMENTS

| | | | |
|---|---|---|---|
| 3,572,629 | 3/1971 | Clark | 251/121 |
| 3,675,892 | 7/1972 | Biermann | 251/121 |
| 4,230,300 | 10/1980 | Wiltse | 251/121 |
| 4,231,347 | 11/1980 | Ohumi et al. | 251/121 |
| 4,278,234 | 7/1981 | Baumann | 251/121 |
| 4,283,041 | 8/1981 | Kujawski | 251/205 |

*Primary Examiner*—Ronald C. Capossela

[57] ABSTRACT

Low flow control valve having contoured cylindrical plug means cooperating with a semi-elastic sleeve, the latter being suitably retained within a valve orifice capable of providing not only tight shut-off, but also no clearance between said valve plug and orifice when the plug is retracted so that all fluid passes by a profiled portion of said plug. Said sleeve type sealing means is further pressure assisted by line fluid to enhance the aforementioned sealing capability.

4 Claims, 3 Drawing Figures

LOW FLOW CONTROL VALVE

BACKGROUND OF THE INVENTION

My invention relates to automatic control valves operated either by a modulating electrical or pneumatical signal to control very minute flow rates, as is customary in the operation of pilot plants in the chemical or petroleum industry (see U.S. Pat. No. 3,997,141). Control valves presently in use for this purpose are either of the low-lift variety utilizing a needle-type plug or the long-lift cylindrical plug type with precision machined longitudinal scratch, commonly referred to as micro-splined plugs. Both of these types exhibit some problems. The needle-type plug is commonly limited to a tapered angle of 30° to avoid self-locking against the seat ring bore. This in turn reduces the stroke whenever small orifice sizes are required. For example, the maximum usable stroke for control with a 1/32 inch orifice is only 0.055 inch, i.e., much too short to achieve any meaningful positioning accuracy with conventional actuating devices. Another drawback is the very high tendency for fluids to cavitate with needle plugs resulting in early destruction of the valve parts.

The micro-splined plugs require extremely accurate machining of splined grooves having depths of less than 0.001 inch. The minimum controllable area, limiting the lowest flow rate that can be regulated, is given by the radial clearance between the external diameter of the plug and the orifice bore. With a normal radial clearance of 0.00025 inch the minimum controllable area of such a plug with $\frac{1}{4}$ inch diameter is $2 \times 10^{-4}$ in$^2$ or 25% of the maximum area of a 1/32 inch dia. orifice, thereby limiting the ratio of max. to min. control area or rangeability to less than 4:1.

My invention, on the other hand, eliminates the amount of minimum controllable area through the use of an elastomeric or plastic sleeve.

A further objective of my invention is the provision of a valve trim with tight closure capabilities. My invention accomplishes this goal by having the fluid assist the circumferential sealing capabilities of said plastic sleeve.

Finally, my invention provides for a throttling valve trim that can be machined very simply in order to get a very precise and repeatable flow characteristic without resorting to unusual precision manufacturing processes.

These and other objectives of my invention will become more easily understood from the following detailed description:

BRIEF DESCRIPTION OF THE DRAWINGS

In the accompanying drawings

DESCRIPTION OF THE PREFERRED EMBODIMENT

Figure 1:
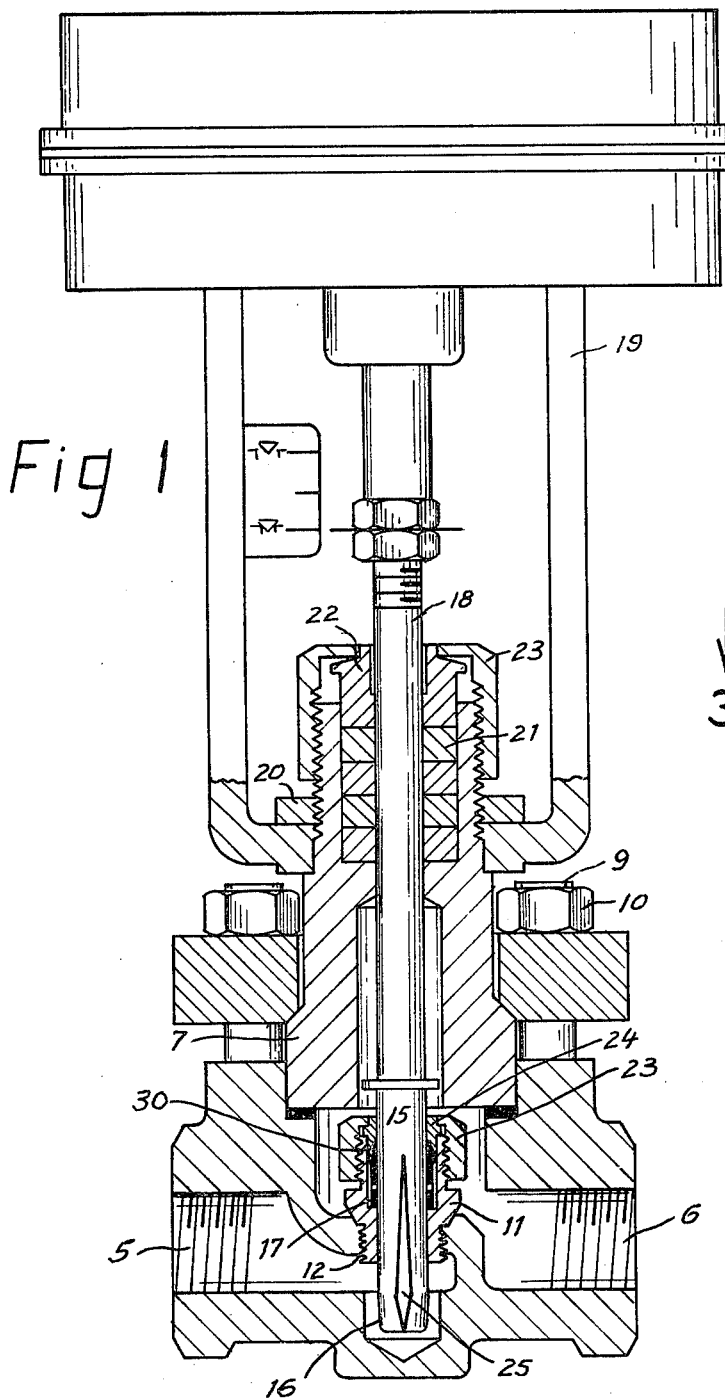
FIG. 1 is a vertical partly sectional view of a preferred embodiment of my invention.

Referring to FIG. 1, there is shown a preferred embodiment of my invention suitable for throttling control of minute flow rates and comprising a housing 4 having a threaded inlet port 5 and an outlet port 6. Said housing 4 is closely coupled with a bonnet 7 by means of studs 9 and hex nuts 10. Housing 4 contains an orifice member 11 within a central vertical bore 12. Orifice member 11 has a central longitudinal valve plug 15 which lower portion 16 is tapered and which upper terminating end engages an elastomeric or plastic sleeve 17 preferably made from filled tetrafluoroethylene within orifice member 11 to provide tight shut-off when in the lower stroke position, as shown.

Valve plug 15 is threadingly engaged to a valve stem 18, the upper terminating end of which is fastened to the moving parts (not shown) of a conventional state of the art valve actuating device 19, the latter being connected to bonnet 7 by a nut 20. A suitable packing means 21, such as Teflon, prevents fluid from leaking past the valve stem 18, aided by a gland follower 22 and stuffing box flange 23.

Figure 2:
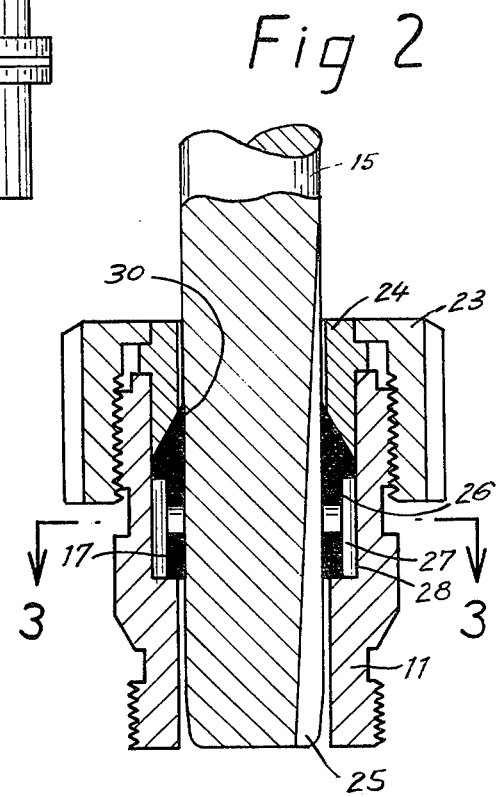
FIG. 2 is an enlarged, central sectional view of the valve plug and orifice as part of my invention.

A retaining nut 23 aided by a conically recessed gland 24 precompresses sleeve 17 around plug 15 for tight shut-off (see FIG. 2). A conical groove 25 is milled into plug 15. Upon upward travel of plug 15, groove 25 is gradually exposed when extending over sleeve 17 to allow a desired amount of fluid to pass from port 5 to port 6 as shown in FIG. 2.

Figure 3:
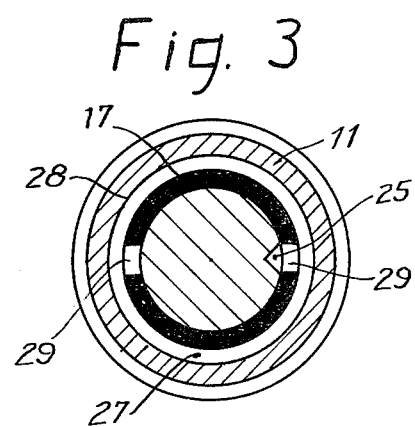
FIG. 3 is an enlarged, horizontal sectional view of the plug and seat ring of my invention taken along the line 3—3 of FIG. 2.

Referring to FIG. 2 and FIG. 3, sleeve 17 has a reduced outer diameter portion 26 which forms a chamber 27 in conjunction with a central retaining bore 28 of orifice member 11. Horizontal holes 29 in turn allow fluid pressure upstream of sealing surface 30 to pass into chamber 27 and thereby assist in compressing sleeve 17 around plug 15 in the lower closing position. Thus, the higher the fluid pressure, the greater the sealing force.

While a particular embodiment of the present invention has been described, it is not intended to limit the invention to such disclosures but changes and modifications may be made herein and thereto within the scope of the following claims:

I claim:

1. Low flow control valve comprising:
   a. a housing having fluid communicating inlet and outlet ports and a central vertical passage interconnecting said inlet and outlet ports;
   b. an orifice member suitably retained within said vertical passage of said housing and having a central longitudinal bore, sleeve-type sealing means tightly retained within said orifice member;
   c. a valve plug slidingly engaged within said longitudinal bore of the orifice member and within said sleeve-type sealing means, said valve plug having a fluid conducting profile at its lower extremity extending exterior of said sealing means to conduct fluid flow when in the upper travel position and an upper solid cylindrical portion disposed to tightly fit within the sleeve-type sealing means when in the lower travel position to effect closure of said orifice member;
   d. said sleeve-type sealing means having a reduced exterior diameter portion and a straight cylindrical central bore slidingly engaging said valve plug, one or more passages disposed perpendicularly to said central bore to provide fluid communication between said central bore and said reduced exterior diameter portion to enable fluid pressure to urge said sealing means against the valve plug when in the lowest travel position in order to enhance the sealing capabilities.
   e. operating means attached to said valve plug.

2. Low flow control valve as described in claim 1, wherein said sleeve-type sealing means is made of polymeric reinforced tetrafluorethylene.

3. Low flow control valve as described in claim 1, wherein said operating means comprises a valve stem threadingly engaging said valve plug on one end and a valve actuating device of conventional construction at the other end.

4. Low flow control valve as described in claim 1, wherein said sleeve-type sealing means is retained within said orifice member by a gland having a central bore with a lower conical recess engaging a similarly shaped extremity of said sealing means, said gland being retained within said orifice member by a retaining nut which threadingly engages the exterior of said orifice member.

* * * * *